UNITED STATES PATENT OFFICE.

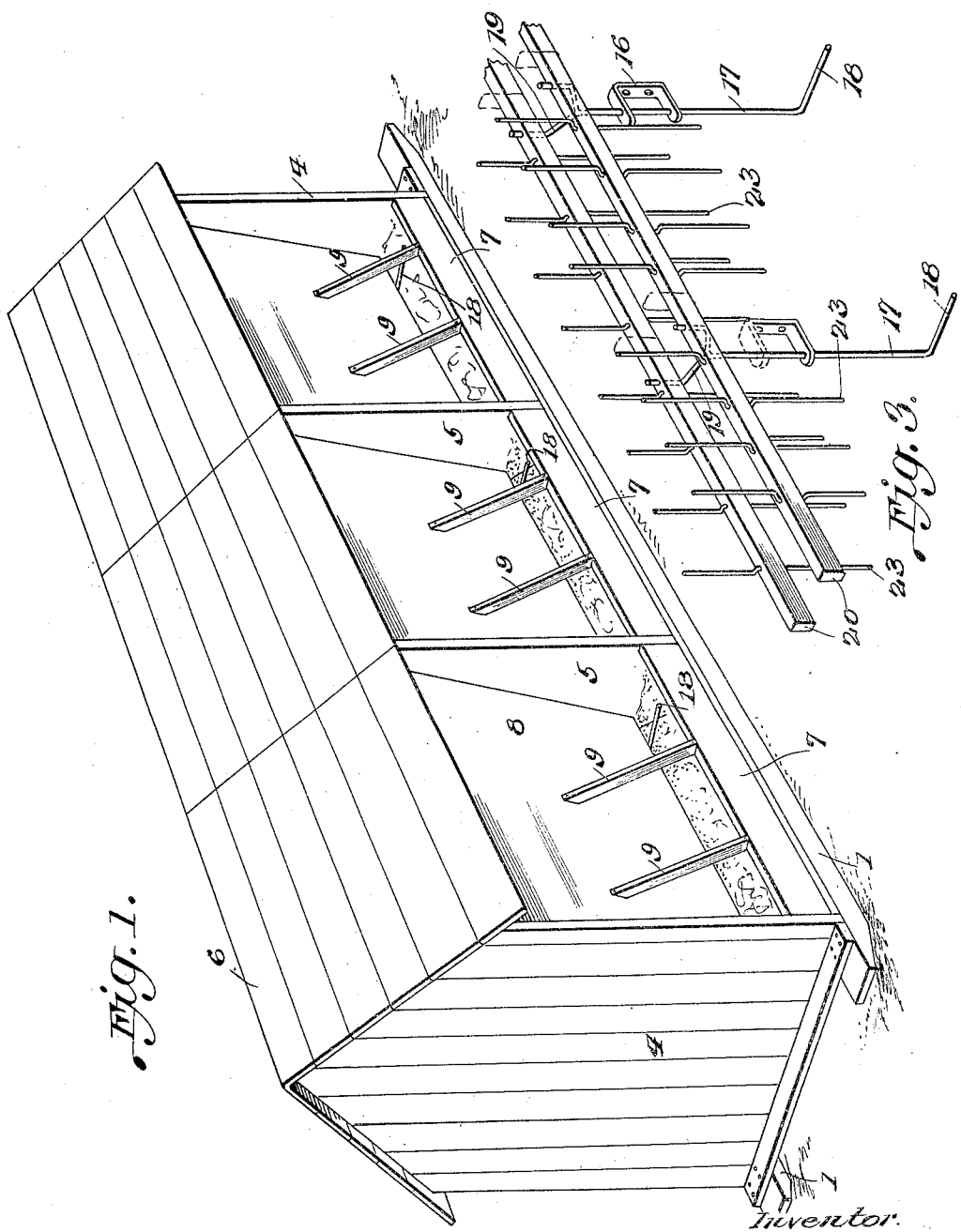

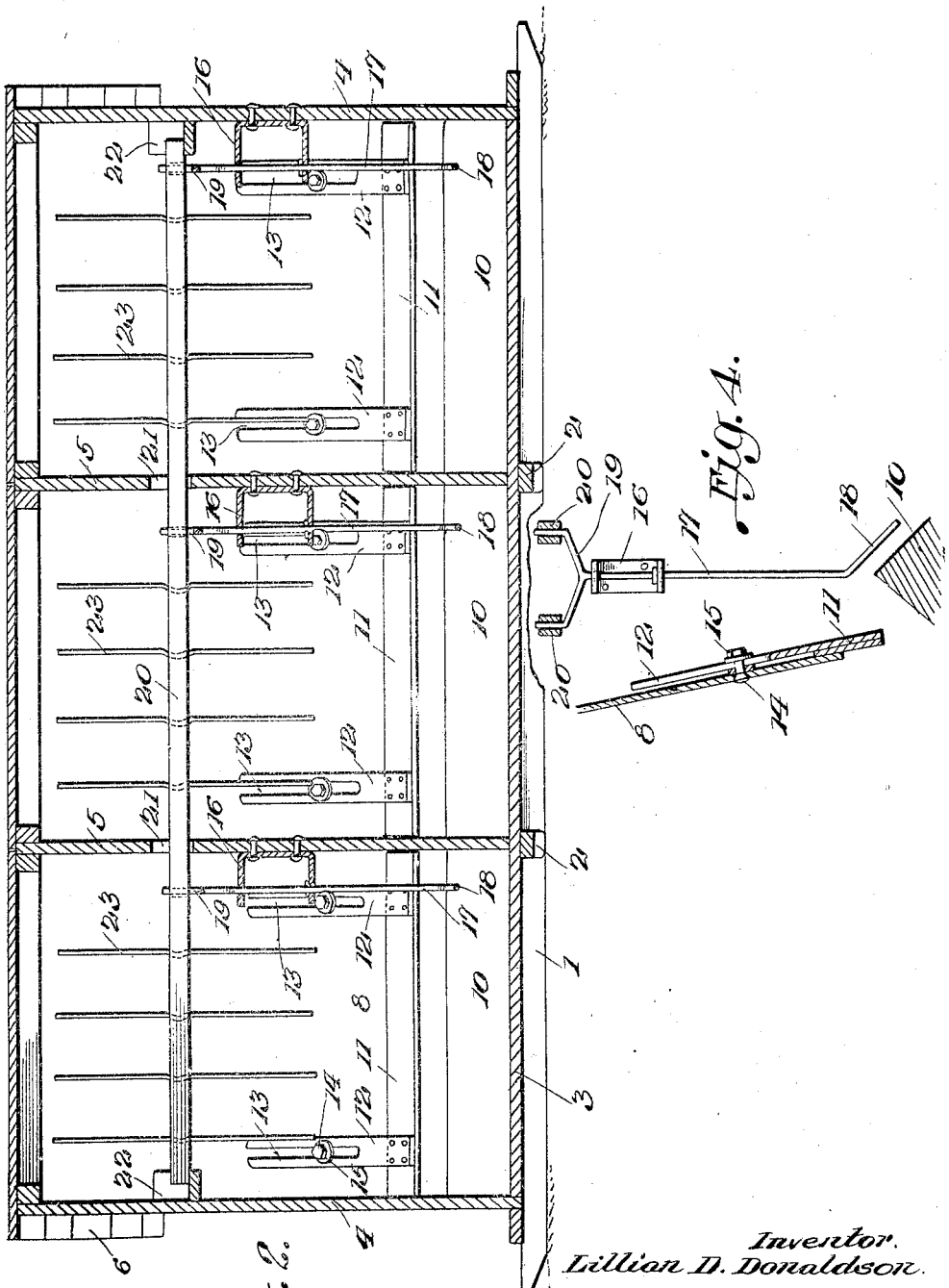

LILLIAN D. DONALDSON, OF NEW WASHINGTON, OHIO.

STOCK-FEEDER.

1,373,602. Specification of Letters Patent. Patented Apr. 5, 1921.

Application filed December 31, 1919. Serial No. 348,520.

*To all whom it may concern:*

Be it known that I, LILLIAN D. DONALDSON, a citizen of the United States, residing at New Washington, in the county of Crawford and State of Ohio, have invented certain new and useful Improvements in Stock-Feeders, of which the following is a specification.

This invention relates to apparatus for feeding small live stock and has for its object the provision of improved means for agitating the feed and preventing choking of the same and also has for its object the provision of means whereby when the animals feed they will agitate the entire contents of the bin so that the feed will flow readily to the feeding trough. Other incidental objects of the invention will appear in the course of the following description.

In the accompanying drawings which illustrate one embodiment of the invention—

Figure 1 is a perspective view of the improved stock feeder;

Fig. 2 is a central vertical longitudinal section of the same;

Fig. 3 is a detail perspective view of the agitator;

Fig. 4 is a detail transverse section showing the arrangement of the means for actuating the agitator, and one of the gage plates.

In carrying out my invention, I employ a pair of runners 1 which also serve as sills to support the feeder and permit the same to be moved from place to place. These sills may be connected and held rigidly in parallel relation by cross bars 2 and upon the sills I secure a floor 3. End walls 4 are erected upon the sills near the ends thereof and between the end walls one or more partitions 5 are erected, the partitions serving to divide the feeder into a plurality of bins or compartments so that varieties of feed may be supplied to the animals. The partitions and end walls are identical in outline and a roof 6 is secured upon and carried by the same so as to protect the feed from the weather and shed rain and snow so that the animals may feed comfortably at all times. Rails 7 are secured longitudinally upon the sills between the end walls and the partitions and between the intermediate partitions, and the side walls 8 are secured between the end walls and the partitions and between the intermediate partitions and carried by the same, the side walls being inclined inwardly and downwardly from the roof to points approximately in the horizontal plane of the upper edges of the rails 7 so that a feeding opening will be provided between each rail and the adjacent side wall but the animals will be prevented from getting at the bulk of the feed and wasting the same. Dividing bars 9 extend between the upper edges of the rails and the side walls at intervals so as to aid in supporting the side walls and also to prevent crowding of the animals when they are feeding.

Along the medial longitudinal line of the floor 3, I secure a deflector 10 which may be of any material and is of inverted V shape in cross section whereby it presents a ridge along the center of the bins to deflect the feed toward the sides of the same and prevent it accumulating at the center where it cannot be reached by the animals and consequently might mold or suffer other decay. On the inner sides of the side walls 8, I secure gage plates 11 which are carried by supporting arms 12 extending upwardly from the plates and provided with longitudinal slots 13 through which set bolts 14 may extend, said bolts being fitted in the side walls and equipped with nuts 15 which may be turned home against the supporting arms so as to secure them in a set position. It will be readily understood that by shifting the gage plates upwardly or downwardly upon the side walls the distance between the lower edges of the gage plates and the divider or deflector 10 may be readily regulated and the flow of the feed to the feeding space controlled.

Within the several compartments or bins, I secure upon the partitions or end walls brackets 16 in which vertical shafts 17 are mounted for rotary movement, said shafts being equipped at their lower ends with cranks 18 which extend under the side walls and into the feeding space, as clearly shown in Fig. 1. At their upper ends, the rock shafts 17 are provided with yokes 19, the ends of which are journaled or pivotally fitted in agitator bars 20 which extend longitudinally of the structure and are slidably supported in slots 21 in the partitions and in steps or recessed blocks 22 upon the end walls. These agitator bars carry fingers 23 which extend above and below the bars, as shown, so that when a sliding movement is imparted to the bars the fingers will be moved through the feed and will agitate the same so that it will be prevented from choking or clogging and will flow readily to the bottoms of the bins and into the feeding spaces.

It will be readily seen from the foregoing description, taken in connection with the accompanying drawings, that I have provided a very simple stock feeder by the use of which the animals will be fed plentifully but prevented from overfeeding and waste of feed will be thereby avoided. The animals insert their heads into the feeding spaces defined by the side walls 8, the rails 7, and the bars 9 and can consequently only reach the feed which may be at the side of the deflector 10 and between the same and the rails 7. The feed can only flow until the level thereof reaches the lower edges of the several gage plates and consequently an over supply of feed cannot be obtained. When the animal's head is inserted in the feeding space adjacent the respecive partitions or the end walls the cranks 18 will be pushed aside and the shaft 17 thereby rocked so that the arms of the yokes 19 will be moved in opposite directions. The agitator bars 20 will consequently be moved endwise in opposite directions and the fingers 23 caused to move through the material above and below the agitator bars so that the feed will be thoroughly loosened and may flow readily to the feeding space. One or more rock shafts 17 may be provided in each compartment as may be desired or they may be omitted from some of the compartments if so preferred and it will be understood that they may be arranged so that the cranks 18 thereon will project laterally to opposite sides of the feeder and agitation of the feed will be effected by the animals at either side of the device.

Having thus described the invention, what is claimed as new is:

1. In a stock feeder, the combination of a bin, an agitator bar mounted for sliding movement therein, agitator fingers carried by said bar, and a rock shaft mounted within the bin and having its upper end offset and engaged in the agitator bar and its lower end provided with a crank to be actuated by a feeding animal.

2. In a stock feeder, the combination of a bin, agitator bars mounted therein for sliding longitudinal movement, agitator fingers carried by said bars, a vertically disposed rock shaft mounted within the bin and provided at its upper end with a yoke having its terminals pivotally engaged in the respective agitator bars, and a crank at the lower end of the rock shaft to be operated by a feeding animal.

3. In a stock feeder, the combination of a bin, parallel agitator bars mounted in the upper portion thereof for horizontal endwise sliding movement longitudinally thereof, vertically disposed fingers secured to and projecting above and below the said bars, and means mounted within and operatively connected to said bars to be operated by a feeding animal for simultaneously reciprocating said bars in opposite directions.

In testimony whereof I affix my signature.

LILLIAN D. DONALDSON. [L. S.]